(12) United States Patent
Shumarayev et al.

(10) Patent No.: US 8,098,724 B2
(45) Date of Patent: Jan. 17, 2012

(54) AUTOMATIC CALIBRATION IN HIGH-SPEED SERIAL INTERFACE RECEIVER CIRCUITRY

(75) Inventors: Sergey Shumarayev, Los Altos Hills, CA (US); Wilson Wong, San Francisco, CA (US)

(73) Assignee: Altera Corporation, San Jose, CA (US)

( * ) Notice: Subject to any disclaimer, the term of this patent is extended or adjusted under 35 U.S.C. 154(b) by 694 days.

(21) Appl. No.: 12/287,009

(22) Filed: Oct. 2, 2008

(65) Prior Publication Data

US 2010/0086017 A1    Apr. 8, 2010

(51) Int. Cl.
*H03H 7/30* (2006.01)
*H03H 7/40* (2006.01)
*H03K 5/159* (2006.01)

(52) U.S. Cl. ........ 375/233; 375/232; 375/234; 375/235; 708/323; 708/322

(58) Field of Classification Search .......... 375/232–235; 708/322, 323
See application file for complete search history.

(56) References Cited

U.S. PATENT DOCUMENTS

| | | | |
|---|---|---|---|
| 7,400,675 B2 | 7/2008 | Moughabghab et al. | |
| 7,701,833 B2 | 4/2010 | Kim et al. | |
| 7,916,780 B2 * | 3/2011 | Lee | 375/232 |
| 2008/0240218 A1 | 10/2008 | Sumesaglam | |
| 2010/0027611 A1 * | 2/2010 | Dai et al. | 375/233 |

* cited by examiner

*Primary Examiner* — Phuong Phu
(74) *Attorney, Agent, or Firm* — Ropes & Gray LLP; Jeffrey H. Ingerman

(57) ABSTRACT

Circuitry for receiving a serial data signal (e.g., a high-speed serial data signal) includes adjustable equalizer circuitry for producing an equalized version of the serial data signal. The equalizer circuitry may include controllably variable DC gain and controllably variable AC gain. The circuitry may further include eye height and eye width monitor circuitry for respectively producing first and second output signals indicative of the height and width of the eye of the equalized version. The first output signal may be used in control of the DC gain of the equalizer circuitry, and the second output signal may be used in control of the AC gain of the equalizer circuitry.

27 Claims, 3 Drawing Sheets

AUTOMATIC CALIBRATION IN HIGH-SPEED SERIAL INTERFACE RECEIVER CIRCUITRY

BACKGROUND OF THE INVENTION

This invention relates to high-speed serial interface ("HSSI") circuitry, and more particularly to automatic calibration of the receiver portion of such circuitry.

High-speed serial data signalling is widely used for transmitting data between devices in electronic systems. As just one example, such signalling may be used to transmit data between several integrated circuit devices on a printed circuit board. Typical high-speed serial data rates are in the range between about 6 Gbps (giga-bits per second) and about 10 Gbps, but higher or lower data rates are also possible.

In many systems that use high-speed serial data signalling, the serial data signal is transmitted without an accompanying clock signal that can be used by the circuitry that receives the data signal to enable the receiver ("RX") circuitry to know when to sample the received data signal in order to capture successive bits in the received signal. In such cases the RX circuitry may include so-called clock and data recovery ("CDR") circuitry to make the sampling time determination. The received signal will also typically have been subject to some loss and/or distortion during transmission. In addition, the receiver circuit components that initially receive and process the incoming signal may not be perfect, and they may themselves tend to introduce further loss and/or distortion before passing the received signal on to downstream circuitry such as the above-mentioned CDR circuitry. Such loss and/or distortion increases the difficulty of accurately recovering data from the serial data signal at the receiver. This difficulty is further increased by such design objectives as reduced voltage or power of the transmitted signal, increased data rate of that signal, etc.

SUMMARY OF THE INVENTION

In view of the above, a possible aspect of the invention is to give circuitry that receives a high-speed serial data signal the ability to automatically compensate for (1) various types and amounts of loss and/or distortion of that signal and/or (2) any tendency of the circuitry that first receives that signal to subject the signal to further loss and/or distortion.

In accordance with certain possible aspects of the invention, circuitry for receiving a serial data signal may include adjustable equalizer circuitry for receiving the serial data signal and producing an equalized version of that signal. The equalizer circuitry may have controllably variable gain (e.g., controllably variable DC gain and/or controllably variable AC gain). The circuitry may further include eye monitor circuitry for monitoring an attribute of an eye of the equalized version. Examples of such an attribute include eye height and/or eye width. The gain is controlled based at least in part on the attribute detected by the eye monitor circuitry. For example, DC gain may be controlled based at least in part on eye height detected by the eye monitor circuitry, and/or AC gain may be controlled based at least in part on eye width detected by the eye monitor circuitry.

In accordance with certain other possible aspects of the invention, a method of receiving a serial data signal may include receiving that signal and producing an equalized version of that signal with controllably variable gain (e.g., controllably variable DC gain and/or controllably variable AC gain). The method may further include monitoring an attribute of an eye of the equalized version. Examples of such an attribute include eye height and/or eye width. The method may still further include controlling the gain based at least in part on the attribute detected in the monitoring an attribute. For example, DC gain may be controlled based at least in part on eye height detected by the eye monitor circuitry, and/or AC gain may be controlled based at least in part on eye width detected by the eye monitor circuitry.

Further features of the invention, its nature and various advantages, will be more apparent from the accompanying drawings and the following detailed description.

DETAILED DESCRIPTION

Figure 1:
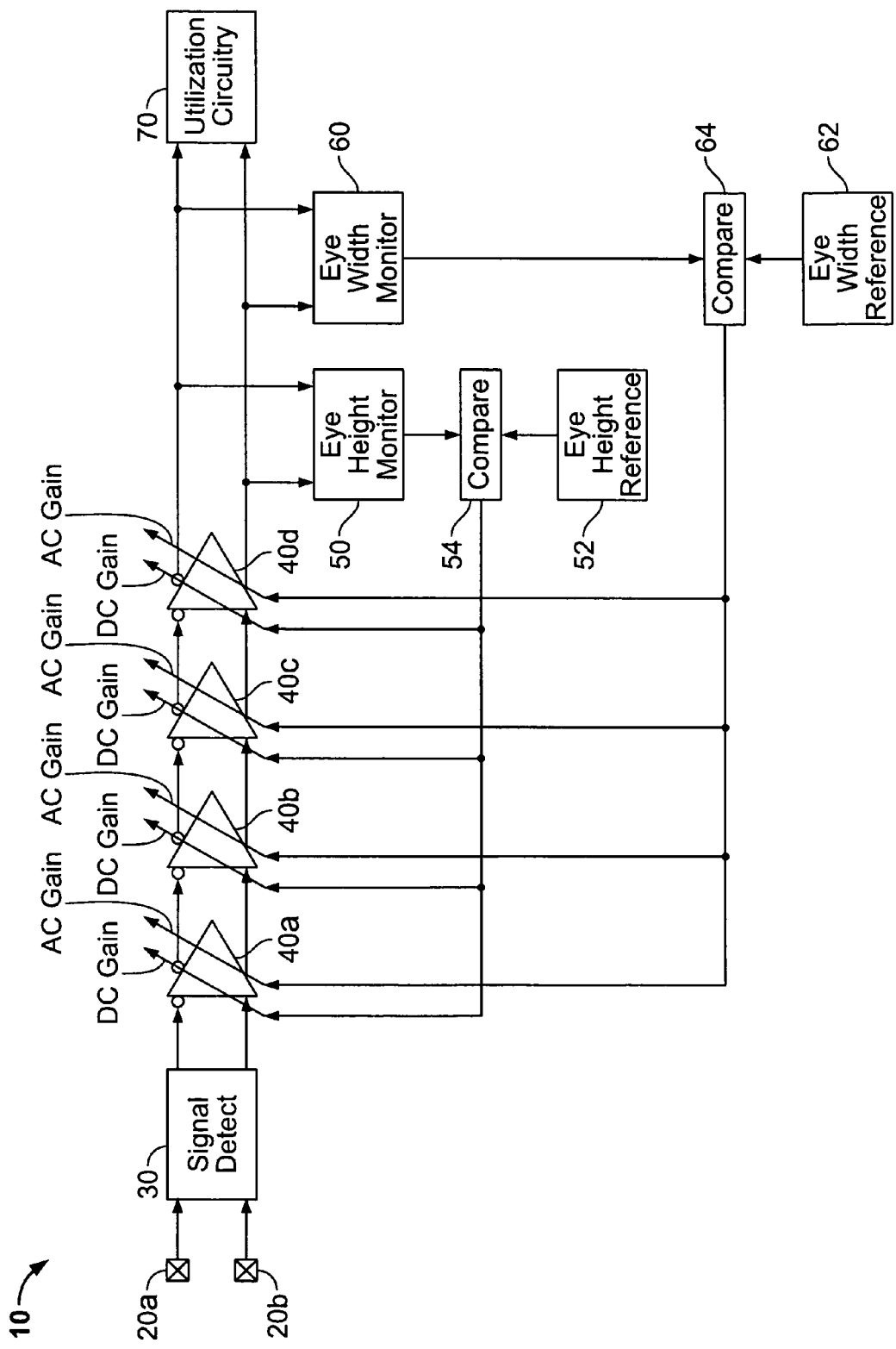
FIG. 1 is a simplified, schematic, block diagram of an illustrative embodiment of circuitry in accordance with the invention.

As shown in FIG. 1, illustrative receiver circuitry 10 in accordance with the invention includes a pair of input terminals 20a and 20b for receiving a high-speed serial data signal in differential form. As is well known to those skilled in the art, this means that the high-speed serial data signal is actually a pair of signals that are the logical complement of one another. For example, a binary 1 data bit may be indicated or signalled by the signal applied to input terminal 20a having a relatively high voltage while the signal applied to input terminal 20b has a relatively low voltage. In such a case, a binary 0 data bit is indicated or signalled by the signal applied to input terminal 20a having a relatively low voltage while the signal applied to input terminal 20b has a relatively high voltage.

The signals applied to input terminals 20a and 20b are applied to signal detect circuit 30, which acts, for example, as input buffer circuitry for receiver 10. Signal detect circuit 30 outputs a pair of differential signals that correspond to the high-speed serial data signal received via terminals 20a and 20b.

The output signals of signal detect circuit 30 are applied to a series of controllably variable, differential, equalizer circuits 40a through 40d. Although four equalizer circuits 40a-d are shown in FIG. 1, it will be understood that this is only an example of what can be done. A smaller or larger number of such equalizer circuits 40 can be provided instead if desired. An illustrative construction for each of equalizer circuits 40 is shown in Shumarayev et al. U.S. patent application Ser. No. 12/134,777, filed Jun. 6, 2008. As shown in that Shumarayev et al. reference, each equalizer circuit 40 has several controllably variable circuit elements which can be used to cause that circuit 40 to give the differential signals applied to it a controllably variable amount of DC gain and/or a controllably variable amount of AC gain. (As is conventional, DC stands for direct current, and AC stands for alternating current.) An example of DC gain is so-called DC offset, i.e., the maximum amount by which the voltages of the high and low signals passing through a circuit 40 differ. Another example of DC gain is the level of the common mode voltage (i.e., the average voltage between the high and low signals passing through a circuit 40). An example of AC gain is how steeply the signals passing through an equalizer circuit 40 transition from relatively low to relatively high voltage or vice versa. Another example of AC gain is the amount (if any) by which an equalizer circuit 40 tends to initially over-drive the signals passing through it immediately after each transition in such signals. The controllably variable elements in each of equalizer stages 40a-d that control the DC gain of that stage are indicated in FIG. 1 by the "DC gain" arrow through the schematic block diagram symbol for that stage in FIG. 1. Similarly, the controllably variable elements in each equalizer stage 40a-d that control the AC gain of that stage are indicated in FIG. 1 by the "AC gain" arrow through the schematic block diagram symbol for that stage in FIG. 1.

From the immediately preceding paragraph it will be seen that each stage 40a-d of the equalizer circuitry can give the signals applied to it a controllably variable amount of DC and/or AC gain, and that these gains are cumulative or additive because the several equalizer circuits 40a-d are connected in series. The manner in which the DC and AC gains of equalizer circuits 40a-d are controlled in accordance with this invention will be covered later in this specification.

The differential output signals of the last stage 40d of the equalizer circuitry are applied in parallel to (1) eye height monitor circuitry 50, (2) eye width monitor circuitry 60, and (3) utilization circuitry 70. Eye height monitor circuitry 50 may be, for example, circuitry like that shown in Ding et al. U.S. patent application Ser. No. 12/082,483, filed Apr. 11, 2008. An example of eye width monitor circuitry 60 is shown in Ding et al. U.S. patent application Ser. No. 12/082,343, filed Apr. 9, 2008. Utilization circuitry 70 may be any circuitry on receiver chip or integrated circuit 10 that makes use of the high-speed serial data signal that is output by equalizer circuitry 40a-d. For example, utilization circuitry 70 may begin with CDR circuitry and continue with any of many other types of circuitry such as various types of decoding, decryption, rate matching, deserialization, digital signal processing ("DSP"), logic (e.g., programmable logic), etc., circuitry.

As is apparent from the above-mentioned Ding et al. references (as well as conventional technology that is well known to those skilled in the art), the "eye" of a serial data signal is the separation between the aspects of the signal that represent the binary digits or bits in that signal. For example, in the case of differential data signals such as are shown in FIG. 1, the eye of a signal is the "open" area between the high and low signals when the traces of those signals for several bits (typically many bits) are superimposed on one another in one "unit interval" or "UI" (i.e., the time period occupied by one bit in the serial data stream or signal). The "height" of such an eye is the maximum high-to-low dimension (along a vertical voltage axis of an "eye diagram") of this open area. Eye height is a measure of usable or reliably detectable voltage swing in the data signal. The "width" of such an eye is the maximum left-to-right dimension (along a horizontal time axis of an eye diagram) of this open area. Eye width is a measure of usable or reliably detectable time duration of individual bits in the data stream. In general, greater eye height can be helpful in enabling downstream circuitry such as circuitry 70 to correctly identify successive binary ones and zeros in the serial data stream. Similarly, greater eye width (as a percentage of UI) can help downstream circuitry 70 correctly identify successive binary ones and zeros in the serial data stream. Circuitry 50 produces an output signal indicative of the height of the eye of the serial data signal currently being output by final equalizer stage 40d. Circuitry 60 produces an output signal indicative of the width of the eye of the serial data signal currently being output by final equalizer stage 40d.

Eye height reference circuit 52 produces an output signal indicative of a height that it is desired for the eye of the output signal of final equalizer stage 40d to have. For example, the reference provided by circuit 52 can be a filtered DC output of signal detect circuit 50. As another example, this reference can be an internally available DC reference voltage. Similarly, eye width reference circuit 62 produces an output signal indicative of a width that it is desired for the eye of the output signal of final equalizer stage 40d to have. For example, the reference provided by circuitry 62 can be based on a filtered AC output of signal detect circuitry 30 or an internally generated voltage.

Compare circuit 54 compares the output signals of elements 50 and 52 and produces an output signal (or signals) indicative of the results of that comparison. The output signal(s) of compare circuit 54 is (are) used to control the DC gain of equalizer circuit stages 40a-d. For example, if compare circuit 54 finds that the eye height measured by monitor 50 is less than the reference eye height from circuit 52, the output signal(s) of compare circuit 54 causes (or cause) the DC gain of equalizer stages 40a-d to increase. Such DC gain increase will stop when compare circuit 54 detects that the measured eye height (from monitor 50) is equal to the desired eye height (from reference 52).

Compare circuit 64 compares the output signals of elements 60 and 62 and produces an output signal (or signals) indicative of the results of this comparison. The output signal(s) of compare circuit 64 is (are) used to control the AC gain of equalizer circuit stages 40a-d. For example, if compare circuit 64 finds that the eye width currently being measured by monitor 60 is less than the reference eye width from circuit 62, the output signal(s) of compare circuit 64 causes (or cause) the AC gain of equalizer stages 40a-d to increase. Such AC gain increase stops when compare circuit 64 detects that the measured eye width (from monitor 60) is equal to the desired eye width (from reference 62).

From the foregoing it will be seen that at least two equalization control loops have been provided. The first loop is a DC loop. This loop includes RX DC gain control. The eye height monitored is measured eye height in response to DC gain changes. This loop will stabilize when measured eye height is the same as an external reference. The external reference can be either a filtered DC output of signal detect 30 or an internally available DC voltage reference. For example, such a voltage reference can be created based on the internal band-gap reference that is usually provided on integrated circuits of the type being described herein. For present purposes this band-gap reference circuitry may include a programmable resistor divider to facilitate the production of whatever accurate voltage reference is required. The second loop is the AC loop. This loop is based on a filtered AC component of signal detect 30 (or an internally generated reference voltage), AC gain control of RX buffer or equalizer stages 40a-d, and eye width monitor 60.

Preferably there is cooperative interaction of the above two loops. The frequency response of each loop should be significantly different from the frequency response of the other loop to ensure overall system stability. For example, one loop may be relatively slow to respond to differences between its monitored and reference values, while the other loop may respond more quickly to differences between its monitored and reference values.

The above two loops can be implemented either in hardware as part of input buffer design or in programmable logic (e.g., in so-called soft IP (intellectual property) in a field-programmable gate array ("FPGA")).

As a result of the present invention, and with appropriate filtration, the closed loop system above can constantly adapt DC and AC gain characteristics of buffer stages 40a-d in accordance with either changing external or internal environments. Adaptation (equalization) criteria can be modified in such a system. For example, the data pattern and data density can be all part of soft IP filtration based on present data traffic. An input buffer 40 that is constantly calibrated will always outperform a one-time calibrated input buffer.

Figure 2:
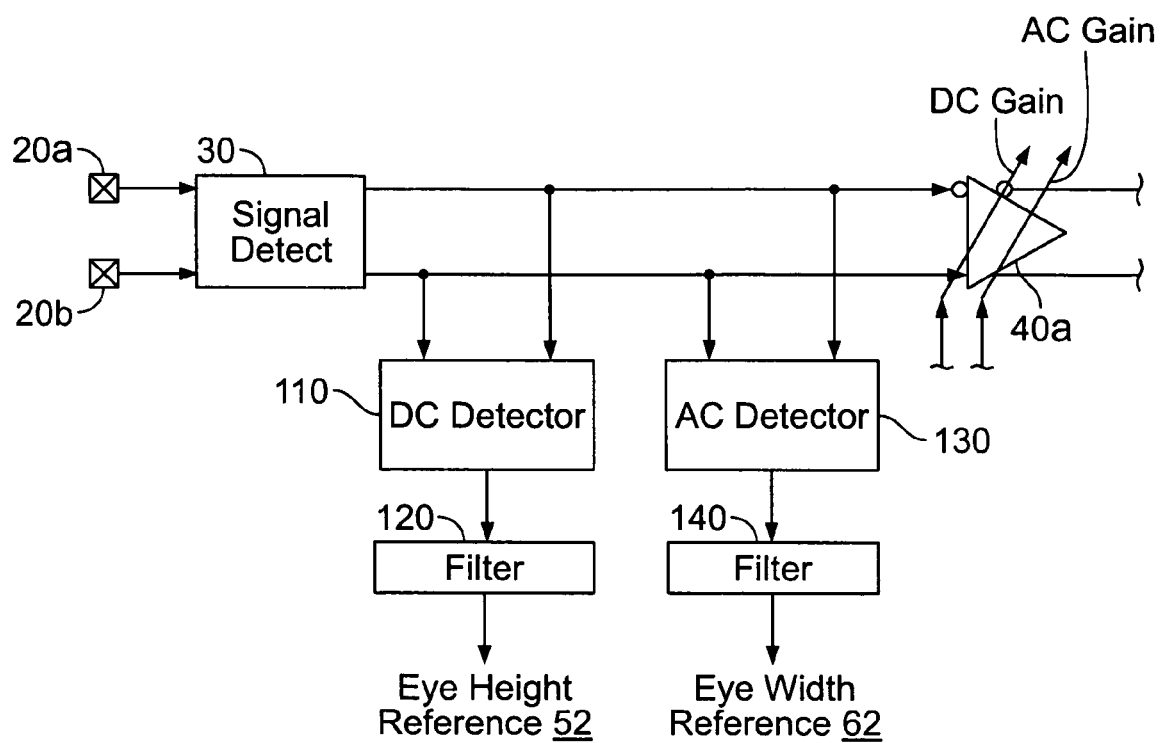
FIG. 2 is a simplified schematic block diagram of an illustrative embodiment of portions of the FIG. 1 circuitry in accordance with the invention.

FIG. 2 illustrates the alternative in which eye height reference 52 is based on a filtered DC output of signal detect 30. Thus FIG. 2 shows the output signals of signal detect 30 being applied to DC detector circuitry 110 (in addition to equalizer stage 40a). DC detector 110 produces an output signal indicative of a DC component (e.g., the DC level) of the signal detect 30 output signals. The output signal of DC detector 110 is filtered by filter circuitry 120 (e.g., to smooth that signal). The resulting output signal of filter 120 is used, either directly or after some further processing such as amplifying, scaling, and/or shifting, to produce eye height reference 52.

FIG. 2 also illustrates the alternative in which eye width reference 62 is based on a filtered AC output of signal detect 30. Thus FIG. 2 shows the output signals of signal detect 30 being also applied to AC detector circuitry 130. For example, AC detector 130 may produce an output signal indicative of the envelope of the output of signal detect 30 in a particular AC frequency band. The output signal of AC detector 130 is filtered by filter circuitry 140 (e.g., to smooth that signal). The resulting output signal of filter 140 is used (either directly or after some further processing such as amplifying, scaling, and/or shifting) to produce eye width reference 62.

Figure 3:
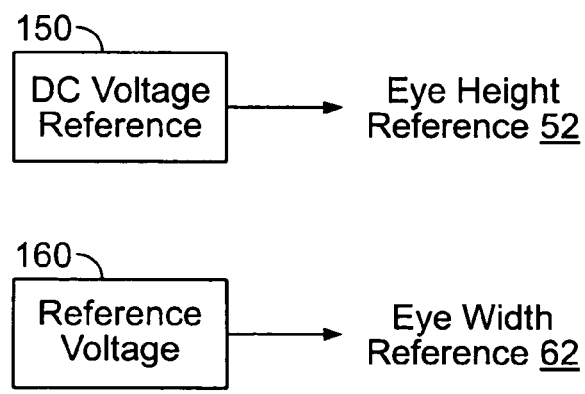
FIG. 3 is a simplified schematic block diagram of another illustrative embodiment of portions of the FIG. 1 circuitry in accordance with the invention.

FIG. 3 illustrates the alternative in which eye height reference 52 is (or is derived from) a DC voltage reference 150 (e.g., on the integrated circuit that includes the circuitry shown in FIG. 1). FIG. 3 also illustrates the alternative in which eye width reference 62 is (or is derived from) a reference voltage 160 (e.g., on the integrated circuit that includes the circuitry shown in FIG. 1).

Figure 4:
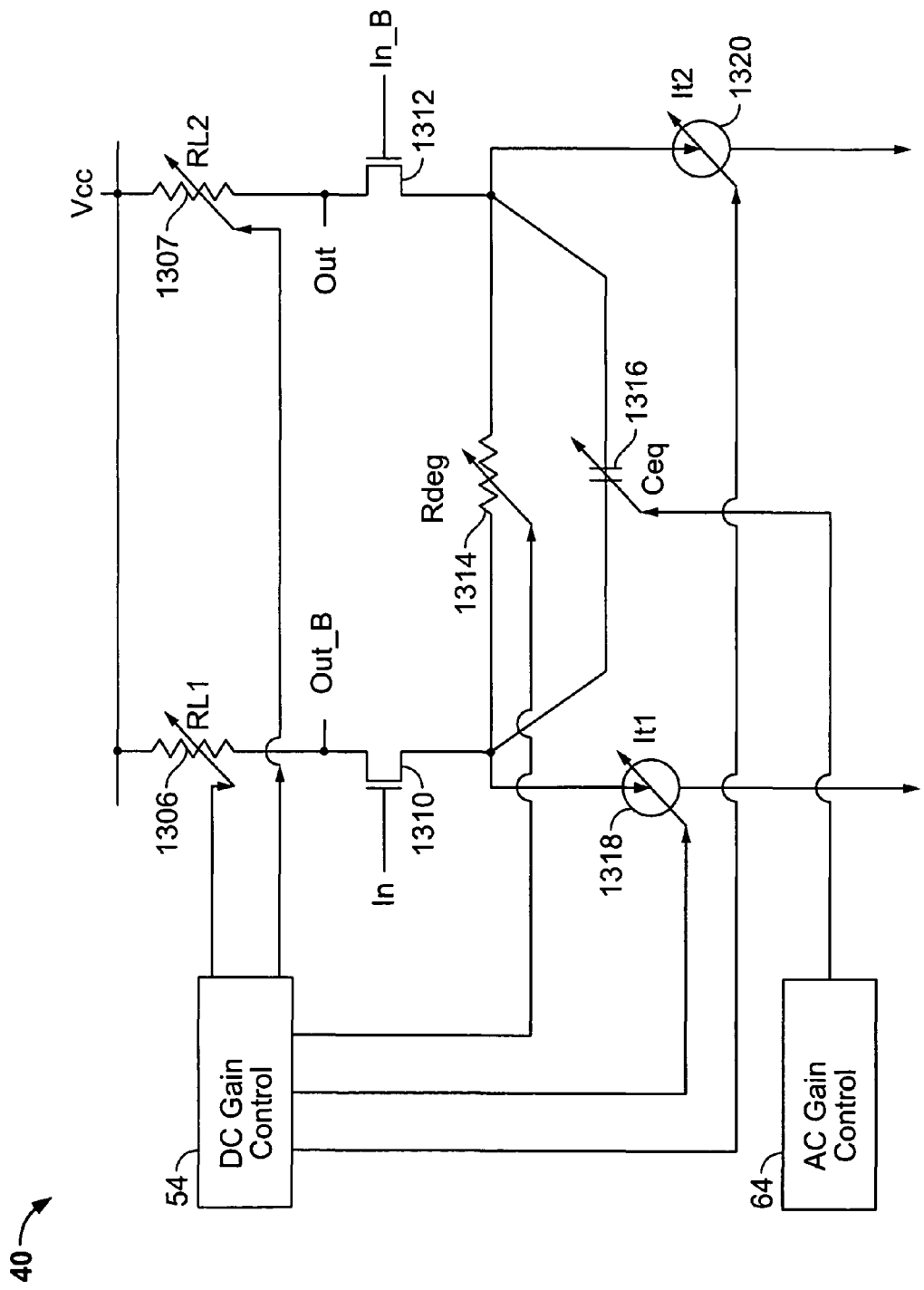
FIG. 4 is a more detailed, but still simplified, schematic block diagram of an illustrative embodiment of a representative portion of the FIG. 1 circuitry in accordance with the invention.

An illustrative buffer design having controllably variable DC and AC gain is shown in FIG. 4. The elements of representative buffer stage 40 are connected between a power supply voltage Vcc and ground (represented by the small, downwardly-pointing triangles). True and complement input signals are applied to input terminals In and In_B, respectively. (In and In_B are respectively the gates of NMOS transistors 1310 and 1312.) True and complement output signals are available at output terminals Out and Out_B, respectively. Load resistor 1306, the drain and source terminals of NMOS transistor 1310, and tail current source 1318 are connected in series with one another (in that order) between Vcc and ground. Similarly, load resistor 1307, the drain and source terminals of NMOS transistor 1312, and tail current source 1320 are connected in series with one another (in that order) between Vcc and ground. Degeneration resistor 1314 is connected between the source terminals of transistors 1310 and 1312. Equalization capacitor 1316 is connected in parallel with degeneration resistor 1314.

As shown in FIG. 4, the resistance RL1 of load resistor 1306 is controllably variable. The same is true for the resistance RL2 of load resistor 1307 and the resistance Rdeg of degeneration resistor 1314. The capacitance Ceq of equalization capacitor 1316 is also controllably variable. The current strength It1 of tail current source 1318 is also controllably variable, and the same is true for the current strength It2 of tail current source 1320.

Equalization capacitor 1316 provides representative buffer stage 40 with adjustable high-frequency peaking. Accordingly, FIG. 4 shows the value of Ceq being controlled by AC gain control circuitry 54 (e.g., compare circuitry 54 in FIG. 1). In this way circuitry 54 can control the AC gain of buffer stage 40.

Load resistors 1306 and 1307 can be used to eliminate any undesirable DC offset in representative buffer stage 40 (i.e., any inequality between the voltages at Out and Out_B when the voltage at In and In_B are equal). Accordingly, FIG. 4 shows the values of RL1 and RL2 being controlled by DC gain control circuitry 64 (e.g., compare circuitry 64 in FIG. 1). FIG. 4 also shows DC gain control circuitry 64 controlling the values of It1 and It2 to give buffer 40 a desired common mode voltage. Moreover, if adjustments to RL1 and RL2 would affect the common mode voltage, DC gain control circuitry 64 can also control It1 and It2 so that the desired common mode voltage is constantly maintained.

In addition to the above offset compensation capabilities, adjustable resistors 1306, 1307, and 1314 give representative buffer stage 40 controllably variable DC gain. The DC gains at outputs Out_B and Out are defined by the ratio of RL1 to 2Rdeg and RL2 to 2Rdeg, respectively. FIG. 4 therefore shows DC gain control circuitry 64 controlling the value of Rdeg, in addition to the above-described ability of circuitry 64 to control the values of RL1 and RL2. In this way, circuitry 64 can control the DC gain of buffer 40.

It will be understood that the foregoing is only illustrative of the principles of the invention, and that various modifications can be made by those skilled in the art without departing from the scope and spirit of the invention. For example, the number of equalizer stages 40 employed in the circuitry can be more or less than the number shown in the depicted illustrative embodiment.

What is claimed is:

1. Circuitry for receiving a serial data signal comprising:
    adjustable equalizer circuitry for receiving the serial data signal and producing an equalized version of that signal, the equalizer circuitry having a controllably variable gain; and
    eye monitor circuitry for monitoring at least one of eye height and eye width of an eye of the equalized version and controlling the gain based at least in part on the one of eye height and eye width detected by the eye monitor circuitry; wherein the eye monitor circuitry comprises:
    a reference source against which the at least one of eye height and eye width is compared, the reference source comprising at least one of:
    circuitry for detecting a DC component of the serial data signal as a source of reference eye height, and
    circuitry for detecting an AC component of the serial data signal as a source of reference eye width.

2. The circuitry defined in claim 1 wherein the controllably variable gain is a DC gain.

3. The circuitry defined in claim 1 wherein the at least one of eye height and eye width is eye height.

4. The circuitry defined in claim 1 wherein the controllably variable gain is an AC gain.

5. The circuitry defined in claim 1 wherein the at least one of eye height and eye width is eye width.

6. The circuitry defined in claim 3 wherein:
    the reference source comprises the circuitry for detecting a DC component of the serial data signal as a source of reference eye height; and the eye monitor circuitry further comprises circuitry for comparing the reference eye height to the eye height detected by the eye monitor circuitry.

7. The circuitry defined in claim 6 wherein the source of reference eye height further comprises:
   circuitry for filtering a DC component output signal of the circuitry for detecting a DC component of the serial data signal.

8. The circuitry defined in claim 5 wherein:
   the reference source comprises the circuitry for detecting an AC component of the serial data signal as a source of reference eye width; and
   the eye monitor circuitry further comprises circuitry for comparing the reference eye width to the eye width detected by the eye monitor circuitry.

9. The circuitry defined in claim 8 wherein the source of reference eye width further comprises:
   circuitry for filtering an AC component output signal of the circuitry for detecting an AC component of the serial data signal.

10. The circuitry defined in claim 2 wherein the equalizer circuitry comprises:
    a variable load resistor and a variable degeneration resistor connected in circuit relation to one another such that a ratio between the load resistor and the degeneration resistor affects the DC gain, and wherein the eye monitor circuitry controls resistance of at least one of the load resistor and the degeneration resistor.

11. The circuitry defined in claim 4 wherein the equalization circuitry comprises:
    a variable equalization capacitor for affecting the AC gain, and wherein the eye monitor circuitry controls capacitance of the equalization capacitor.

12. Circuitry for receiving a serial data signal comprising:
    adjustable equalizer circuitry for receiving the serial data signal and producing an equalized version of that signal, the equalizer circuitry including a controllably variable element for adjusting a gain of the equalized version as compared to the serial data signal;
    eye monitor circuitry for producing an output signal indicative of at least one of eye height and eye width of an eye of the equalized version; and
    control circuitry for using the output signal as a basis for controlling the controllably variable element; wherein the eye monitor circuitry comprises:
    a reference source against which the at least one of eye height and eye width is compared, the reference source comprising at least one of:
    circuitry for detecting a DC component of the serial data signal as a source of reference eye height, and
    circuitry for detecting an AC component of the serial data signal as a source of reference eye width.

13. The circuitry defined in claim 12 wherein the at least one of eye height and eye width is eye height.

14. The circuitry defined in claim 12 wherein the gain is a DC gain.

15. The circuitry defined in claim 12 wherein the at least one of eye height and eye width is eye width.

16. The circuitry defined in claim 12 wherein the gain is an AC gain.

17. A method of receiving a serial data signal comprising:
    receiving the serial data signal and producing an equalized version of that signal with a controllably variable gain;
    monitoring at least one of eye height and eye width of an eye of the equalized version; and
    controlling the gain based at least in part on the at least one of eye height and eye width detected in the monitoring at least one of eye height and eye width, said controlling comprising at least one of:
    deriving a reference eye height from the serial data signal by detecting a DC component of the serial data signal, and
    deriving a reference eye width from the serial data signal by detecting a AC component of the serial data signal.

18. The method defined in claim 17 wherein the controllably variable gain is a DC gain.

19. The method defined in claim 17 wherein the at least one of eye height and eye width is eye height.

20. The method defined in claim 17 wherein the controllably variable gain is an AC gain.

21. The method defined in claim 17 wherein the at least one of eye height and eye width is eye width.

22. The method defined in claim 19 wherein the controlling the gain comprises:
    comparing the eye height detected to the reference eye height.

23. The method defined in claim 17 wherein the deriving a reference eye height further comprises:
    filtering an output of the detecting a DC component.

24. The method defined in claim 21 wherein the controlling the gain comprises:
    comparing the eye width detected to the reference eye width.

25. The method defined in claim 17 wherein the deriving a reference eye width further comprises:
    filtering an output of the detecting an AC component.

26. The method defined in claim 18 wherein the controlling the DC gain comprises:
    controlling a ratio between values of resistance of a plurality of resistors.

27. The method defined in claim 20 wherein the controlling the AC gain comprises:
    controlling capacitance of an equalization capacitor.

* * * * *